United States Patent
Barnard et al.

[11] Patent Number: 5,823,484
[45] Date of Patent: Oct. 20, 1998

[54] HOSE PIPE, OR CONDUIT SNAP-IN SUPPORT SYSTEM

[75] Inventors: Steven W. Barnard, Redondo Beach; Keith A. Holmes, Huntington Beach, both of Calif.

[73] Assignee: McDonnell Douglas Corporation, St. Louis, Mo.

[21] Appl. No.: 732,863

[22] Filed: Oct. 15, 1996

Related U.S. Application Data

[60] Provisional application No. 60/027,182, Sep. 30, 1996.

[51] Int. Cl.⁶ .................................................... F16L 3/24
[52] U.S. Cl. ................................................ 248/72; 248/65
[58] Field of Search .................................. 248/56, 65, 72, 248/73, 74.1, 74.2, 74.3

[56] References Cited

U.S. PATENT DOCUMENTS

| | | | |
|---|---|---|---|
| 1,416,679 | 5/1922 | Barry . | |
| 2,354,404 | 7/1944 | Sayles | 211/113 |
| 3,228,640 | 1/1966 | Wolsh | 248/72 |
| 3,454,247 | 7/1969 | Geisinger | 248/56 |
| 3,486,726 | 12/1969 | Kindorf et al. | 248/72 |
| 4,289,288 | 9/1981 | Gransberry | 248/56 |
| 4,295,618 | 10/1981 | Morota | 248/73 |
| 4,723,749 | 2/1988 | Carraro et al. | 248/72 |
| 4,840,334 | 6/1989 | Kikuchi | 248/73 |
| 4,907,766 | 3/1990 | Rinderer | 248/57 |
| 5,007,605 | 4/1991 | Horvath | 248/65 |
| 5,277,387 | 1/1994 | Lewis | 248/74.2 |
| 5,595,363 | 1/1997 | De Leebeeck | 248/72 |

*Primary Examiner*—Ramon O. Ramirez
*Assistant Examiner*—Willie Berry, Jr.
*Attorney, Agent, or Firm*—Bell Seltzer Intellectual Property Law Group of Alston & Bird LLP

[57] ABSTRACT

A flexible and potable water hose and ridged conduit support systems in a aircraft provides a self-locating snap-in potable water support bracket which supports a generally cylindrical tray for receiving a potable water hose. The bracket slips over a structural beam flange without requiring that the structural member be drilled or otherwise prepared for fastening of the bracket. Attachment is maintained through frictional compression by the bottom of the bracket.

22 Claims, 3 Drawing Sheets

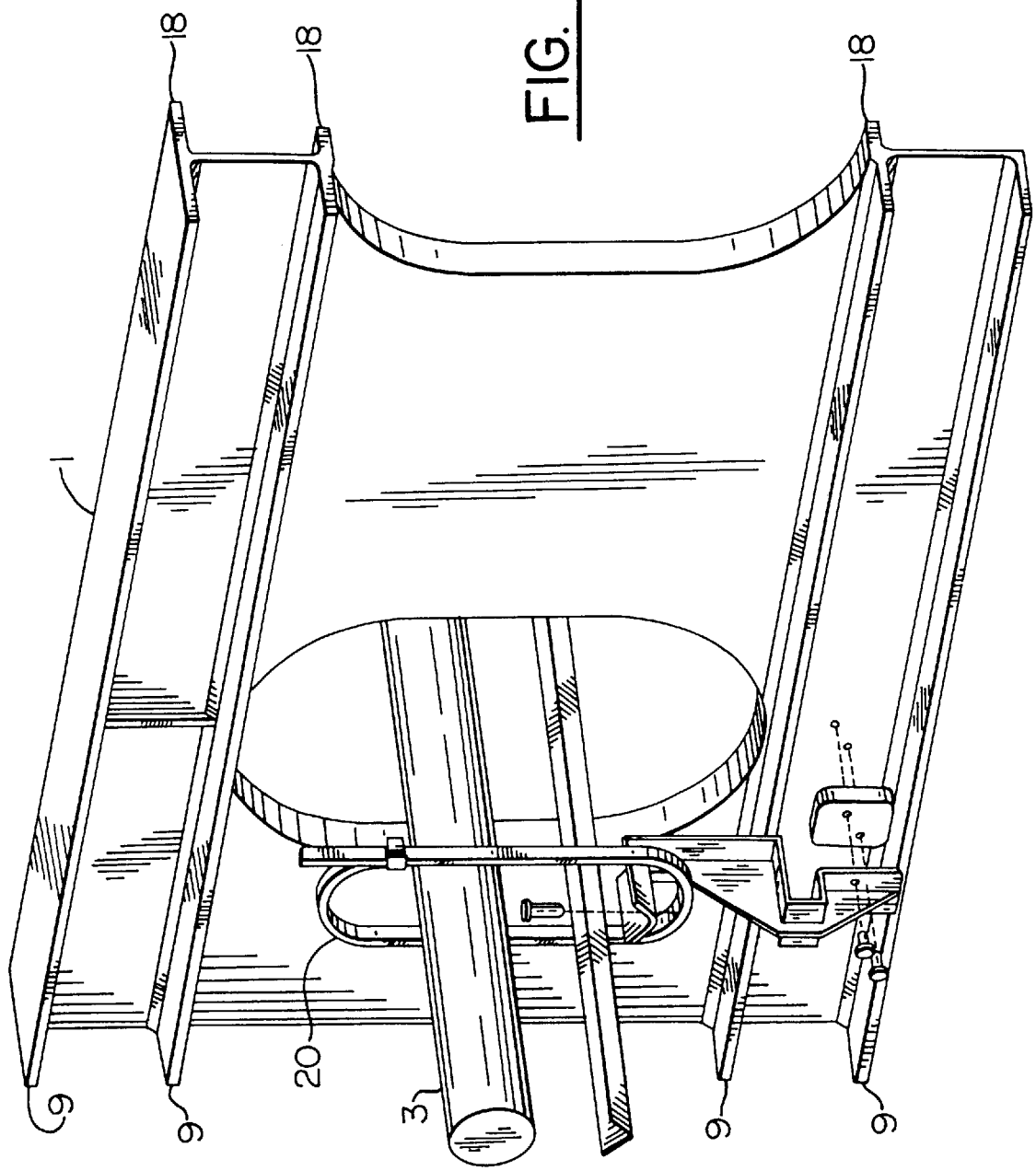

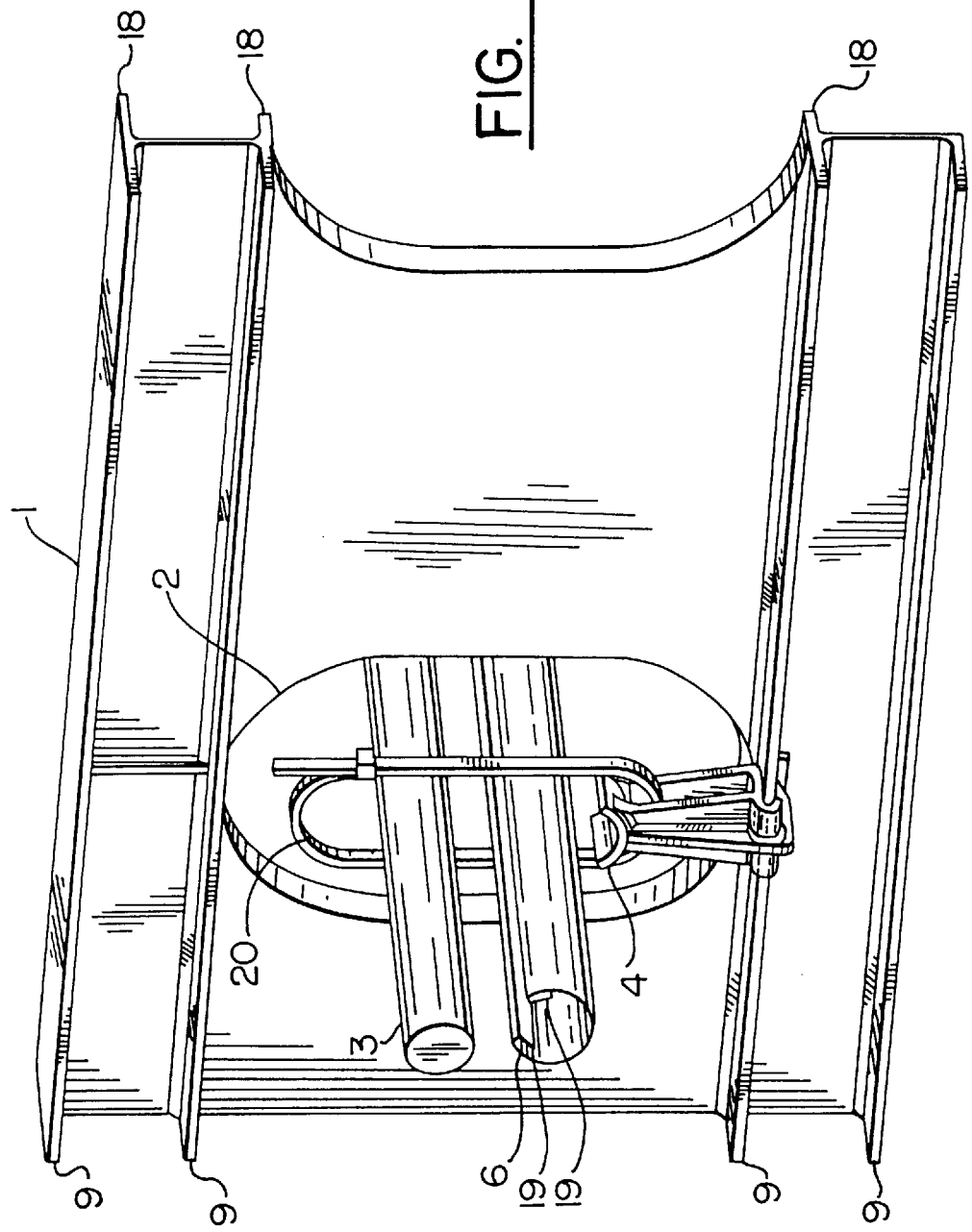

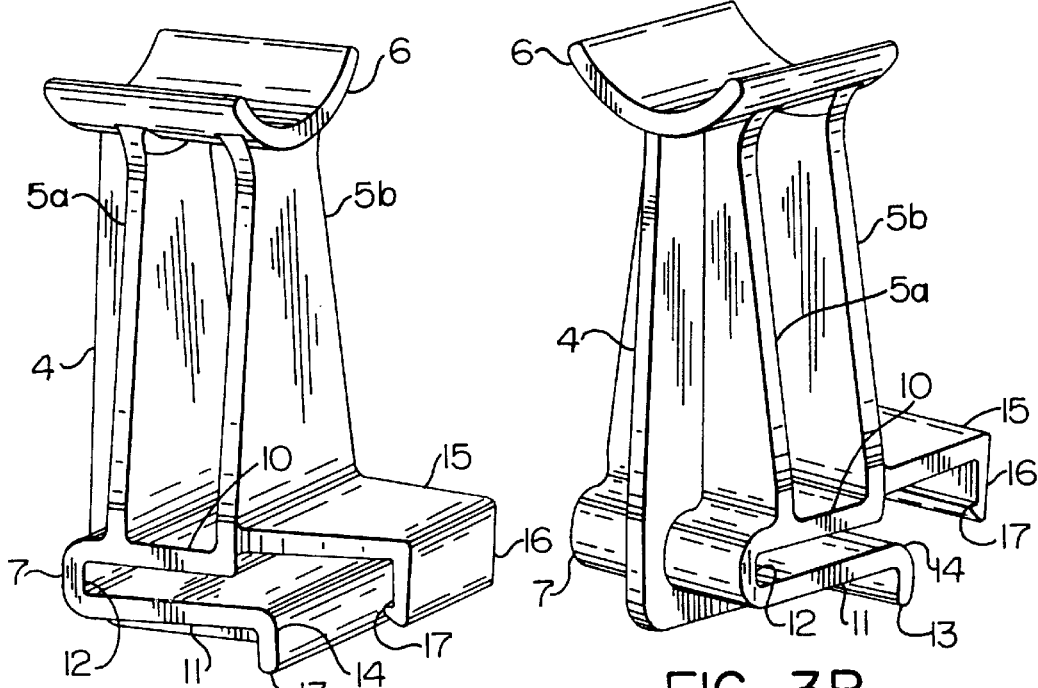
FIG. 3A.
FIG. 3B.
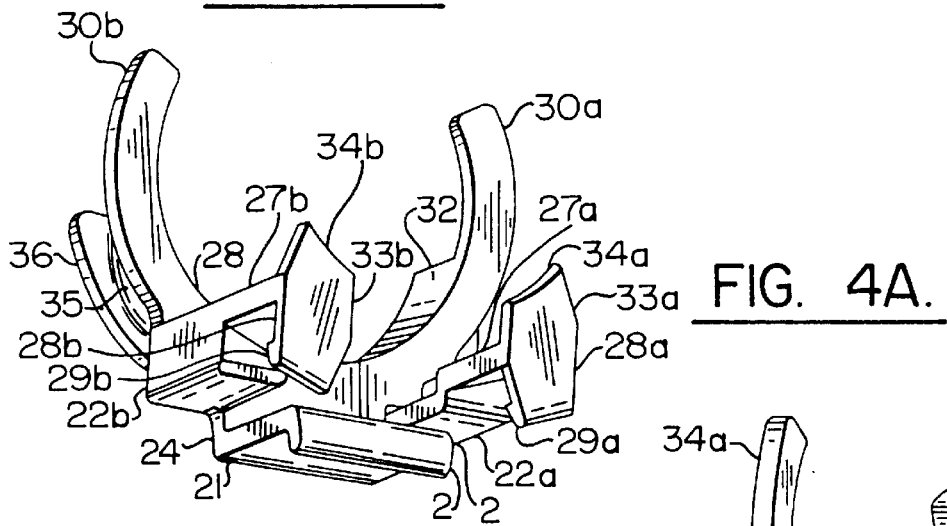
FIG. 4A.
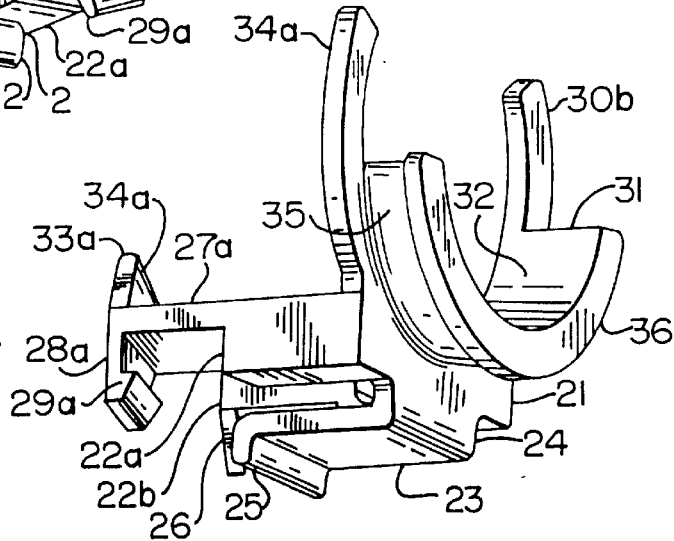
FIG. 4B.

HOSE PIPE, OR CONDUIT SNAP-IN SUPPORT SYSTEM

CROSS-REFERENCE TO RELATED APPLICATION

The present application claims the benefit of U.S. provisional patent application Serial No. 60/027,182, filed Sep. 30 1996, and entitled "HOSE, PIPE OR CONDUIT SUPPORT SYSTEM".

BACKGROUND OF THE INVENTION

1. Field of the Invention

The field of this invention relates to pipe and hose positioning and support systems for ridged or flexible conduits to be held in a fixed position relative to a structural element. More specifically, this invention relates to flexible and potable water hose and ridged conduit support systems in aircraft.

2. Description of Related Art

There are numerous patents which provide for pipe positioning and support systems and include fasteners for fastening elongated objects such as a pipe which permit a snap-in registration. Such a system is typified by U.S. Pat. No. 4,840,334 to KIKUCHI and in U.S. Pat. No. 4,295,618 to MOROTA, et al. Both the MOROTA and KIKUCHI patents relate to devices which permit a snap-in of the pipe itself as opposed to a snap-in of the pipe mount. The U.S. Pat. No. 5,277,387 to LEWIS, et al. does disclose a pipe supporting bracket which has snap-in portion in the bottom thereof. Similarly, U.S. Pat. No. 3,228,640 to WOLSH shows a unitary plastic pipe support clip which slips on to a flange of a structure for the support of plastic pipe. Current aircraft designs provide for potable water hoses to be routed through lightening holes and supported by a tray mounted on a bracket which is riveted to structural members within the aircraft. Such a design is shown in FIG. 1. In current designs, these brackets are made from cast aluminum. Drilled holes must be made in the support structure or beam and the bracket attached by rivets in place. The support tray which is also drilled, in place, supports the potable water hose and is fastened to the bracket by a pin. These must be refinished and plated if cut and support separate part numbers. A tie wrap then secures the potable water hose to the support tray and bracket. Installation of the current system is expensive and time consuming.

BRIEF DESCRIPTION OF THE INVENTION

The current invention provides a self-locating snap-in potable water support bracket which supports a generally cylindrical tray for receiving the potable water hose. The bracket slips over a structural beam flange without requiring that the structural member be drilled or otherwise prepared for fastening of the bracket. Attachment is maintained through frictional compression by the bottom of the bracket. The bracket extends upward and provides a curved support for receiving the circular support tray and potable water hose combination which is then secured to the support bracket by a tie wrap. The the snap-in bracket is not riveted or screwed to the structural because it self-locates in the structural member within the lightening hole and compensates for minor lateral misalignment. It is easily installed and uses no rivets or threaded fasteners. The new composite support tray snaps over the hose and is tie wrapped in place along with the hose as described above. The tray may be cut to fit on installation thereby eliminating the requirement of manufacturing multiple part number configurations thereof. The bracket is an molded nylon part and is designed to snap over the edge of the lightening hole structure. The cylindrical support tray is extruded plastic material. Since the tray is of extruded plastic, no refinishing or plating is required on cutting and separate part numbers are not required. This saves a considerable amount of labor and rework and numbering inventory requirements. While the invention has been described in the form of water lines, other hoses or electrical wiring could be supported by the bracket in the support tray system to simplify installation and the invention is not restricted to potable water lines. An alternative embodiment of the bracket does not require a tray and is used to support ridged pipes. It has a pair of gripping arms to hold and secure the pipe when positioning the same through the supporting structure. Each bracket is provided with a ridge for receiving a tie wrap to secure the pipe and bracket together. In this particular instance, the fact that the bracket and the tray are made of non-metallic substances make the combination non-corrosive and ideal for aircraft installation.

BRIEF DESCRIPTION OF THE DRAWINGS

FIG. 1 is a perspective view of current supports.

FIG. 2 is a perspective view of the snap-in water line bracket in a lightening hole.

FIG. 3A is a perspective view of the hose support bracket from the back and side.

FIG. 3B is a perspective view of the hose support bracket from the front and side.

FIG. 4A is a perspective view of the alternative support bracket from the rear.

FIG. 4B is a perspective view of the alternative support bracket from the side. .

PREFERRED EMBODIMENT(S) OF THE INVENTION

With reference to FIG. 2, an aircraft structural member 1 is provided with a lightening hole 2 through which a potable water hose, conduit or similar structure 3 may be extended. The self-locating snap-in support bracket 4 as shown in FIG. 3 comprises a pair of generally vertically disposed arms 5a and 5b which support a curved receptacle 6. The arms 5 are supported by a base 7. The base 7 of the bracket 4 is a generally "U" shaped member having an support section 10, a receiving section 11 generally parallel to said support section 10 and an intermediate section 12 integral with and disposed between said upper section 10 and lower section 11 and spacing them apart to generally form a U shaped base 7.

The receiving section 11 also is provided with a flange 13 integral therewith and generally disposed at 90° to the receiving section 11. The intersection of flange 13 and lower section 11 is provided with a curved edge 14 to facilitate receipt of the flange 9 of the support structure 1 by the receiving section 11.

The bracket 4 also has an engagement plate 15 having a flange 16 with a hooked end 17 for engagement with the back of the support structure 1. The hooked end 17 may or may not be used with this invention but in the preferred embodiment the hooked end 17 engages a ridge 18 on the back of the support structure 1 as shown in FIG. 2.

In operation, the base 7 of the snap-in support bracket 4 is slipped over the front edge of the flange 9 as shown in FIG. 2. The flange 16 of the engagement plate 15 snaps over the back edge of the structural member 1. A curved tray 6 receives a potable water hose 3 to provide structural support between adjacent aircraft structural members 1 through which the hose 3 is routed. The tray 6 may be cut to whatever length required. Since it is of extruded plastic it need not be reworked during installation as is required with metal trays. The tray 6 may be provided with overlapping edges 19 or other frictionally engaging members so that the hose will be held in frictional engagement with (i.e. snapped into engagement with) the tray 6 until secured with the tie wrap. In most aircraft the hose 3 is rubber and would sag without support and create stress and fatigue points. The potable water hose 3 and the tray 6 are secured in place on the support bracket 4 by a tie-down wrap 20 which encircles the water hose 3 and the support tray 6 and is routed through the opening 21 formed between the legs 5a and 5b of the bracket 4 and beneath the curved receptacle 6 shaped to receive the outer diameter of the tray 6. In addition, while a flat engagement plate 15 has been shown receiving the support structure 1, it is recognized that various shapes of the base or the engagement plate 15 can be used to fit curvature or other shape of the lightening holes 2 or other structural members and such is considered within the scope of this invention.

An alternative embodiment as shown in FIGS. 4A and 4B is used for mounting brackets which are used to secure ridged pipes at the top of the lightening holes 2. The base 21 is similar to the first embodiment, in that, the base comprises a pair of supporting sections 22a and 22b, a receiving section 23, and an intermediate section 24 which spaces said supporting sections 22a and 22b apart from one another and from said receiving section 23. Receiving section 23 also has a flange 25 with a curved surface 26 for accommodating receipt of the flange 9 of support structure 1.

However, the arms 27a and 27b which support the receptacle 28 are positioned generally parallel with the base 22 and are integral with the support sections 24a and 24b of the base 21. Instead of a single engagement plate 15 as before, the arms 27a and 27b each serve this purpose and each has a first flange 28a and 28b respectively which have hooked ends 29a and 29b for engaging the ridge 18 on the structural support 1. Each of the arms 27a and 27b has an extension flange 33a and 33b respectively which are disposed opposite flanges 28a and 28b on each of the arms. These extension flanges 33a and 33b each have a curved support surface 34a and 34b which provide extended support for a ridged hose, conduit or pipe or as the case may be, a tray for receiving the same. The opposite end of said arms 27a and 27b have a second set of flanges in the form of curved arms 30a and 30b which are disposed in a semicircular pattern approximately equal to but slightly greater than the hose, conduit or pipe 3 which is to be inserted into said bracket 4. A receptacle 31 is integral with said arms 30a and 30b and supported by said arms 27a and 27b. The inner surface 32 of the receptacle 31 is shaped to engage the outer surface of said hose, conduit or pipe 3 (or the tray 6, as the case may be). Arms 30a and 30b are rigid but sufficiently resilient that they will expand to accommodate forced entry of the hose, pipe or conduit and resiliently closed thereabout to temporarily hold the hose, pipe or conduit in place until a tie wrap secures the same.

The receptacle 31 is also provided with a recess 35 disposed opposite the receptacle surface 32 which receives the tie wrap 20. The tie wrap 20 is held in place in the recess by a semicircular ridge 36.

In operation, a hose, pipe or conduit 3 is snapped into the bracket of FIGS. 4A and 4B. The curved sections of the extension flanges 33a and 33b rest against the hose, pipe, or conduit 3 and cause the same to lie generally flush with the surface 32 of the receptacle 31. When a hose, pipe or conduit 3 is introduced into the bracket the arms 30a and 30b will move apart sufficient to receive the conduit 3 and snap back in place about the hose, pipe or conduit 3 to hold it in position in the receptacle 31 until secured with tie wrap 20. Since the bracket is not secured to the structural support 1 in a fixed position and the bracket can hold the hose, conduit or pipe 3 while it is being installed, both longitudinal adjustment of the hose, pipe or conduit 3 as well as transverse adjustment of the bracket during the installation process takes place prior to tie wrapping the hose into place.

While the bracket 4 of the first embodiment was designed to support flexible pipes and hoses above the point of attachment to the supporting structural member 1 and the second embodiment was designed to provide support for ridged pipes and conduits below the point of attachment to the supporting structural member 1, either embodiment may be used in any position and with or without the supporting tray 6 dependent upon the specific installation required.

Having thus described the invention what is claimed is:

1. A bracket for attachment to a structure flange on a structural member for supporting an elongated member which extends through an opening in the structural member, comprising:

a base adapted for releasable engagement with said structure flange, an engagement member attached to said base and adapted to extend through the opening in said structural member and releasably engage a surface of the structural member on a side of the opening opposite from said structure flange, at least one support arm supported by said base, and p1 a support receptacle attached to said arm at the end opposite said base for supporting said elongated member.

2. A bracket as described in claim 1 wherein said support receptacle further comprises at least one pair of gripping arms adapted for releasably engaging said elongated member attached to said support receptacle.

3. A bracket as described in claim 2 further comprising an elongated structure supported by said base having at least one extension thereon adapted for receiving said elongated member and supporting the same at a point spaced apart from said support receptacle.

4. A bracket as described in claim 3 further comprising an elongated tray for receiving said elongated member and providing extended structural support along at least a portion of the length of said elongated member.

5. A bracket as described in claim 4 wherein said support receptacle formed to match the shape of said elongated member.

6. A bracket as described in claim 5 further comprising a securing device engaging said elongated member on at least one side and said supporting receptacle on the other for securing said elongated member to said supporting receptacle.

7. A bracket as described in claim 1 further comprising a support tray for supporting said elongated member, said support tray having a pair of spaced-apart portions which are resiliently deformable away from each other to receive said elongated member therebetween, said deformable portions being adapted to retain said elongated member in said support tray.

8. A bracket as described in claim 7 wherein said support receptacle formed to match the shape of said tray.

9. A bracket as described in claim 8 further comprising a securing device for engaging said elongated member on at least one side and said supporting receptacle on the other for securing said elongated member to said supporting receptacle.

10. A bracket as described in claim 1 further comprising an elongated tray for receiving said elongated member and providing extended structural support along at least a portion of the length of said elongated member.

11. A bracket as described in claim 10 wherein said support receptacle is formed to match the shape of said tray.

12. A bracket as described in claim 1 wherein said base further comprises:
   a. an first section for supporting said arm,
   b. an intermediate section attached on one side of said upper section, and
   c. at least one second section attached to the opposite side of said intermediate section and disposed generally parallel with said upper section and spaced apart from said first section, said first section and said second section adapted for receiving said flange between said sections.

13. A bracket as described in claim 12 wherein said engagement member is attached to said upper section and further comprises a hooked end adapted to releasably engage the surface of said structural member opposite said structure flange.

14. A bracket as described in claim 13 wherein said upper and said lower sections of said base are biased toward one another and receive said structure flange in a frictional engagement.

15. A bracket for attachment to a structure flange on a structural member for supporting an elongated member comprising:
   a semi-rigid base adapted for frictional engagement with said structure flange adjacent a first edge thereof, an engagement member adapted to extend transversely along said structure flange and engage a second edge thereof opposite said first edge,
   at least one support arm attached to said base at one end, and
   a support receptacle received by said engagement member opposite said base.

16. A bracket as described in claim 15 further comprising:
   a. a flexible tray supported by said support receptacle adapted for releasably receiving said elongated member.

17. A bracket as described in claim 16 wherein said support receptacle is formed to match the shape of said tray.

18. A bracket as described in claim 17 wherein said base further comprises:
   a. an upper section for supporting said arm,
   b. an intermediate section attached to one side of said upper section,
   c. a lower section attached to said intermediate section and disposed generally parallel with said upper section and spaced apart therefrom.

19. A bracket as described in claim 18 wherein said engagement member comprises a flange attached at one end of the upper section adapted to engage said structural member opposite the structure flange of said structural member.

20. A bracket as described in claim 19 wherein said upper and said lower sections of said base are biased toward one another and receive said structure flange in a frictional engagement.

21. A bracket for attachment to a structure flange on a structural member for supporting a flexible elongated member which extends through an opening in said structural member comprising:
   a semi-rigid plastic base having a first section, an intermediate section attached to one side of said first section, a second section attached to said intermediate section opposite said first section and disposed generally parallel with said first section and spaced apart therefrom, said first and second sections biased toward one another to engage said structure flange in a frictional engagement,
   an engagement member attached to said first section and adapted to extend through the opening in said structural member and releasably engage a surface of the structural member on a side of the opening opposite from said structure flange,
   a plurality of support arms attached to the first section of said base at one end thereof,
   a support receptacle attached to said arms opposite said base, and
   an extruded plastic tray formed to substantially match the shape of the elongated member received by said support receptacles said tray adapted for releasably engaging said elongated member.

22. A bracket as described in claim 21 wherein said engagement member further comprises a flanged end formed to align with the surface of said support structure opposite said support structure flange.

* * * * *

UNITED STATES PATENT AND TRADEMARK OFFICE
CERTIFICATE OF CORRECTION

PATENT NO. : 5,823,484
DATED : October 20, 1998
INVENTOR(S) : Barnard et al.

It is certified that error appears in the above-identified patent and that said Letters Patent is hereby corrected as shown below:

In the Abstract, line 1, "ridged" should read --rigid--; line 2, before "aircraft", "a" should read --an--.

Column 4, line 32, cancel "p1", begin new paragraph with --a--.

Column 5, line 34, begin a new paragraph with "an".

Column 6, line 41, changing "receptacles" to read --receptacle,--.

Signed and Sealed this

Twentieth Day of April, 1999

Attest:

Q. TODD DICKINSON

*Attesting Officer*   *Acting Commissioner of Patents and Trademarks*